T. B. CREWS, Jr.
VALVE.
APPLICATION FILED DEC. 13, 1915.
1,210,427.
Patented Jan. 2, 1917.
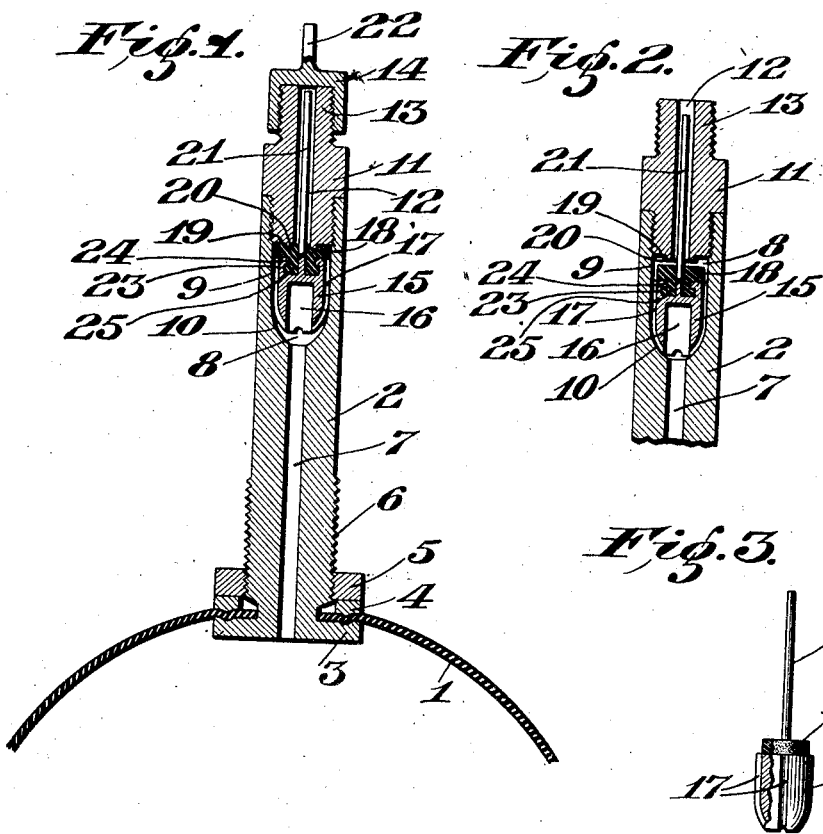
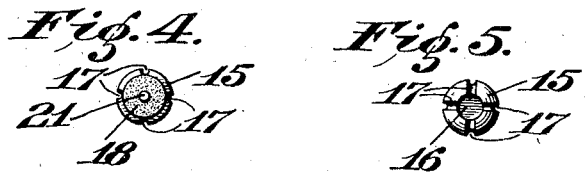
Inventor:
Thomas B. Crews, Jr.,
By Bruce A. Elliott,
his Atty.

UNITED STATES PATENT OFFICE.

THOMAS B. CREWS, JR., OF ST. LOUIS, MISSOURI, ASSIGNOR TO VULCAN VALVE COMPANY, OF ST. LOUIS, MISSOURI, A CORPORATION OF MISSOURI.

VALVE.

1,210,427.  Specification of Letters Patent.  Patented Jan. 2, 1917.

Application filed December 13, 1915. Serial No. 66,487.

*To all whom it may concern:*

Be it known that I, THOMAS B. CREWS, Jr., a citizen of the United States, residing in the city of St. Louis and State of Missouri, have invented new and useful Improvements in Valves, of which the following is a specification.

This invention relates to fluid pressure valves, and more particularly to an air valve for pneumatic tires and the like, although it is not to be limited to such use.

The principal objects of the invention are to produce a valve of simple and durable construction, which will operate and seat accurately and rapidly, to provide a novel sealing arrangement of the valve and valve seat, to provide for the ready renewal of the seating portion of the valve, and to attain certain advantages which will hereinafter more fully appear.

In the accompanying drawing illustrating a practical embodiment of the invention, Figure 1 is a sectional view of a fragment of an ordinary pneumatic tire inner tube with the valve applied thereto, showing how the valve member is seated when the tire is inflated; Fig. 2 is a fragmentary sectional view showing the position of the valve member when the tire is deflated; Fig. 3 is a view, partly in elevation and partly in vertical section, of the valve member detached; Fig. 4 is a top end view of the valve member; and Fig. 5 is a bottom end view of the valve member.

Referring now to the drawings, the numeral 1 indicates an ordinary pneumatic tire inner tube to which is attached a valve casing in the form of a tube 2, said tube having a flanged head or collar 3 at its inner end, between which and a ring 4, the tire tube is clamped by a nut 5 placed on the screw-threaded portion 6 of the valve tube.

The inner portion of the valve tube 2 has a relatively small bore 7, and the outer portion a larger cavity or valve chamber 8, a portion of the side of which, toward the outer end, is straight, as at 9, the inner end portion being tapered or conoidal, as at 10, and communicating with the bore 7. The extreme outer portion of the cavity or chamber 8 is screw-threaded to receive a plug 11 having an axial bore 12, said plug having a reduced externally screw-threaded portion 13 on which is placed a cap 14.

Within the valve chamber 8 is a valve member 15, a portion of which is straight and of substantially the same cross dimension as the chamber 8, but relatively shorter, so as to have a limited endwise movement therein, the inner end portion of the valve member being tapered to correspond to the taper of the chamber. In the valve member is a relatively deep axial recess 16 which is always open to communication with the bore 7 of the valve tube 2. The valve member is further provided with a multiplicity of grooves 17 in its side, said grooves extending from top to bottom thereof, communicating at their inner ends with said recess 16, and affording passageways for the air. Four of these grooves are shown, but a greater or less number may be provided.

On the outer end of the valve member 15 is a rubber or other suitable resilient seat portion or cushion 18 which is normally flat, as best shown in Figs. 2, 3 and 4, and adapted to coöperate with the seat 19 afforded by the inner end of the plug 11, said seat being generally flat except for an annular rib or protuberance 20 surrounding the bore 12 of said plug. This annular protuberance, as shown, is square in cross section, which is a shape which will impress the resilient seat portion without cutting it; but, obviously, the rib may be rounded or beveled, as desired. When the valve is seated under the back pressure from the tire, the resilient seat portion 18 is distorted and indented by the protuberance 20 and snugly engages the depressed flat bearing face of the seat 19 of the plug 11 which surrounds the protuberance; and the endwise compression of the portion 18 tends to bulge or spread it laterally, so that, under heavy pressure, its side portion may engage the side of the chamber 8 to make the seal still further effective. Normally, however, the diameter of the portion 18 is considerably less than that of the valve member 15 so as not to block the passageways afforded by the grooves 17. The pressure on the valve also operates to place the middle portion of the resilient portion 18 in compression, tending to expand its central portion laterally and also in an axial direction against the faces of the rib 20.

The valve member 15 is further provided with a deflating stem 21 which extends into the bore 12 of the plug 11 and terminates near the outer end thereof; and the cap 14 is provided with a projection 22 which may be applied to the end of the deflating stem to unseat the valve member. The resilient seat portion 18 of the valve member may be attached in any desirable manner, but it is preferable to provide the valve member with a relatively deep axial recess 23 in its outer end and have the side of the recess undercut so as to form an inturned annular lip 24, and then make the resilient seat member 18 with a portion 25 which is a counterpart of said recess. That is, the recess may be substantially T-shape in cross section, and the seat member 18 correspondingly provided with a T-shape extension or in other words a head or collar connected to the body by a reduced neck. This member 18 may be molded onto the valve member 15, or made separately and the portion 25 then forced into the recess in the end of the valve member, a central aperture being provided for the passage of the stem 21, so that said member 18 may be readily removed and replaced or a new one inserted in its stead when it becomes worn or deteriorates. By reason of the central recess 23 evidently the end of the valve presents an elevated annular bearing face.

The valve member 15 may be more or less tapered or conoidal, as desired, but the seat end portion should be straight or cylindrical for a sufficient distance to guide it in a right line and insure the proper seating relation with respect to the inner end of the plug 11. The grooves 17 permit a free passage of the air at all times except when the valve member is seated at its outer end, and while it is true that a certain portion of the air from the tire will tend to pass through the grooves and escape through the bore 12 after the pressure from the inflating pump or source of compressed air supply from the outside ceases, the tapering shape of the inner end portion of the valve offers a sufficient resistance to the free passage of the air through said grooves to supplement the action of the air against the bottom of the recess 16 in moving the valve outward.

As the valve member has only a slight movement in either direction, it will in consequence of the action of the air thereon, as above described, be seated with the utmost rapidity and there firmly held until again displaced in the inflating operation or by inward pressure on the deflating stem 21. The correlative arrangement of the recess 16 and the grooves 17 is also such that the air pressure tends at all times to center the valve member 15 so that it is well balanced in its movement; and the uniform contour of the tapered or conoidal portions of the valve member and chamber permits the valve member to readily settle itself with the recess 16 directly over the bore 7 of the valve tube 2.

When the valve is pressed against the seat the annular bearing face of the valve around the recess presses the cushion 18 against the depressed portion of the seat 19 and confines and distorts the middle portion of the cushion or gasket 18. This has the effect of increasing the pressure of the rib 20 against the cushion. The central stem 21 being rigid, operates to resist the compression and this increases the compression in the rubber in the opening and adjacent the rib.

I claim:

1. In a device of the class described, the combination of a member having a valve chamber formed therein, a valve having a limited longitudinal movement in said valve chamber, a valve seat at one end of said chamber having an opening therethrough, and having an annular protuberance surrounding said opening, the end of said valve adjacent to said valve seat having an elevated annular bearing face, and a compressible seat portion on the end of said valve portion projecting across said elevated annular bearing face so as to be pressed against said seat by said elevated annular bearing face, said valve seat having a depressed bearing face adjacent to said protuberance to engage and receive the pressure of said compressible seat portion when pressed thereagainst by said elevated annular bearing face, said elevated annular bearing face operating under the pressure to confine and distort the compressible seat portion, and cause the same to conform closely to the outline of said protuberance, said protuberance constructed with blunt edges whereby it impresses without cutting said compressible seat portion.

2. In a device of the class described, the combination of a member having a valve chamber formed therein, a valve having a limited longitudinal movement in said valve chamber, a valve seat at one end of said chamber having an opening therethrough, and having an annular protuberance surrounding said opening, and a depressed bearing face adjacent said protuberance the end of said valve adjacent said valve seat having a relatively deep recess formed therein, and having an annular bearing face surrounding said recess, and a compressible cushion held in said recess and extending over said annular face, whereby the pressure on said valve toward said seat operates to compress said cushion against said depressed bearing face in an annular area around said opening, and thereby confines and effects compression and distortion of the middle portion of the cushion and presses the same against said protuberance.

3. In a device of the class described, the combination of a member having a valve chamber formed therein, a plug having a valve seat at the end of said valve-chamber and having a central bore therethrough forming an opening on said seat, said seat having an elevated annular protuberance surrounding said opening and a depressed bearing face adjacent said protuberance, a valve having a limited longitudinal movement in said valve-chamber, the end of said valve adjacent said valve seat having a relatively deep recess formed therein with a stem extending from the bottom of said recess longitudinally within said bore, said valve having an annular bearing face surrounding said recess and a compressible cushion surrounding said stem, held in said recess and extending over said annular face, whereby the pressure of said valve toward said seat operates to compress said cushion against said depressed bearing face in an annular area around said opening and thereby confines and effects compression of the middle portion of the cushion and distorts and presses the same against said protuberance, said stem operating to give the central portion of said cushion an increased resistance under the pressure of said protuberance.

In testimony whereof I have hereunto set my hand.

THOMAS B. CREWS, Jr.